Dec. 28, 1937.  A. C. HOOF  2,103,368

FUEL CONTROL MECHANISM

Filed Sept. 6, 1935  8 Sheets-Sheet 1

Inventor:
Addison C. Hoof
By Harry H. Hitzeman
Atty.

Dec. 28, 1937.   A. C. HOOF   2,103,368
FUEL CONTROL MECHANISM
Filed Sept. 6, 1935   8 Sheets-Sheet 2
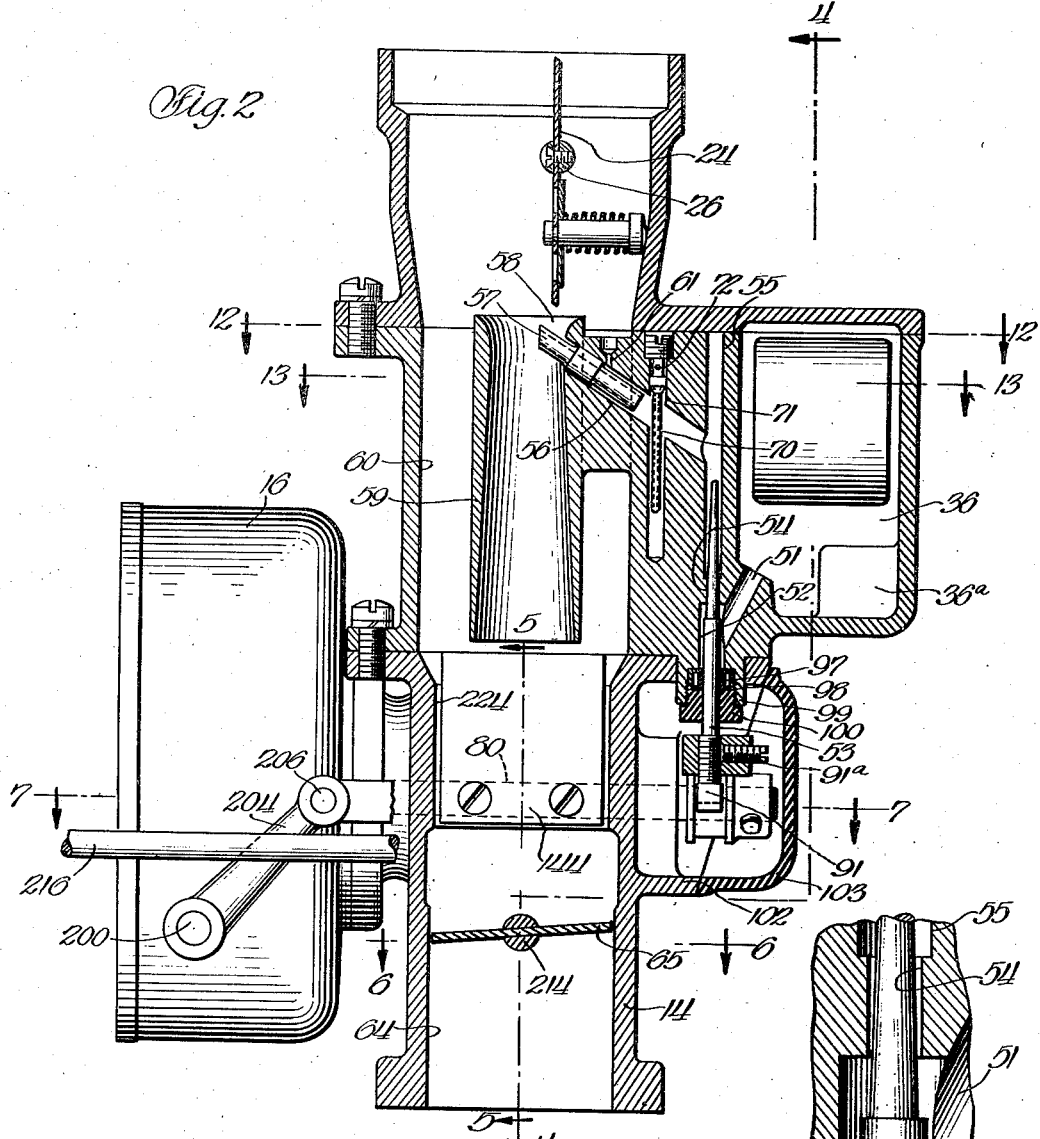
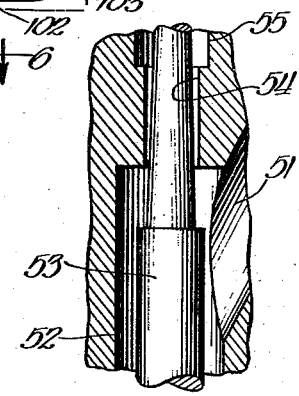
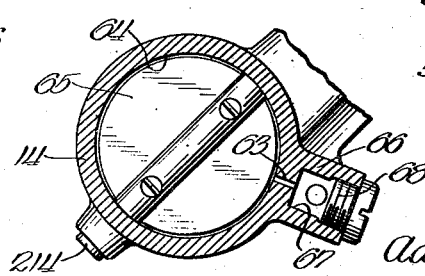

Dec. 28, 1937.    A. C. HOOF    2,103,368
FUEL CONTROL MECHANISM
Filed Sept. 6, 1935    8 Sheets-Sheet 3

INVENTOR.
Addison C. Hoof
BY
Harry H. Hitzeman
ATTORNEY.

Dec. 28, 1937. A. C. HOOF 2,103,368
FUEL CONTROL MECHANISM
Filed Sept. 6, 1935 8 Sheets-Sheet 4
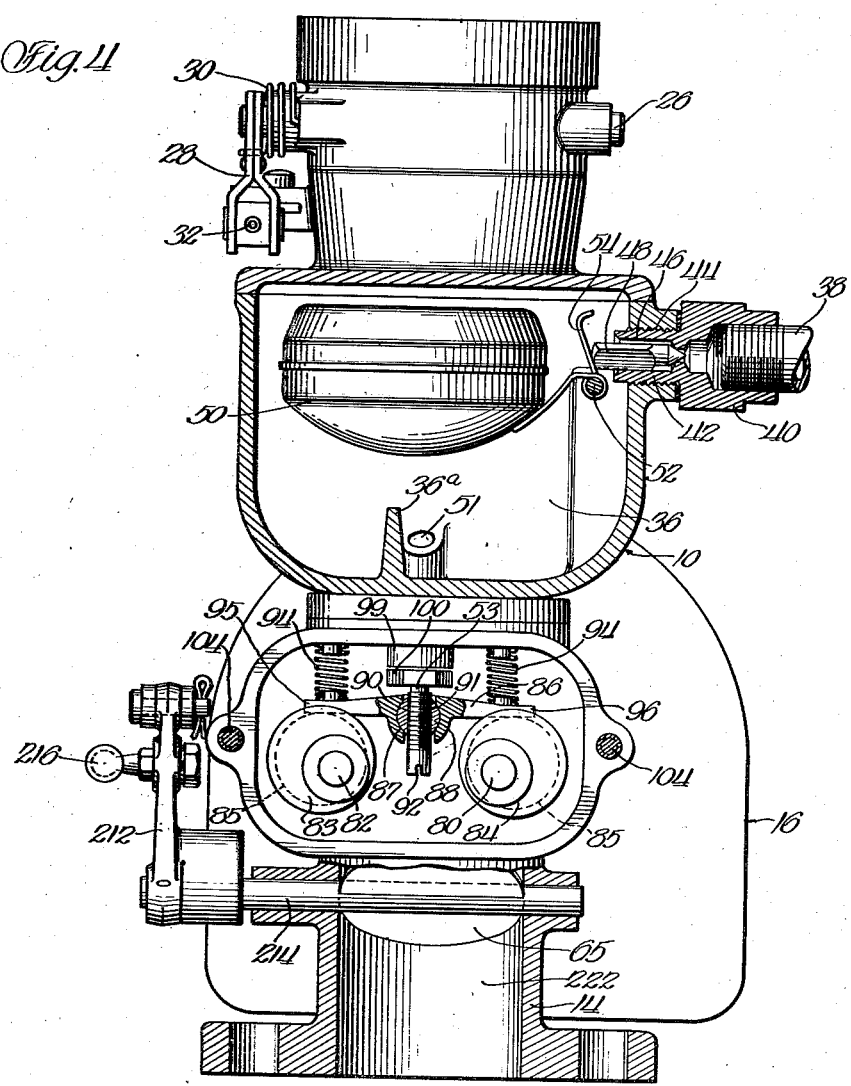
Fig. 4
Fig. 5
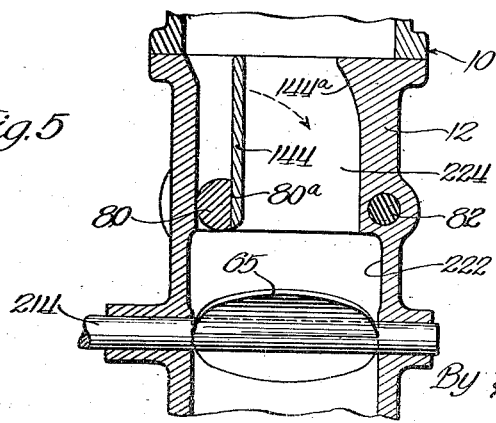
Inventor:
Addison C. Hoof
By Harry N. Hitzeman
Attys.

Inventor:
Addison C. Hoof
By Harry H. Hitzeman
Atty.

Dec. 28, 1937.  A. C. HOOF  2,103,368
FUEL CONTROL MECHANISM
Filed Sept. 6, 1935  8 Sheets-Sheet 6
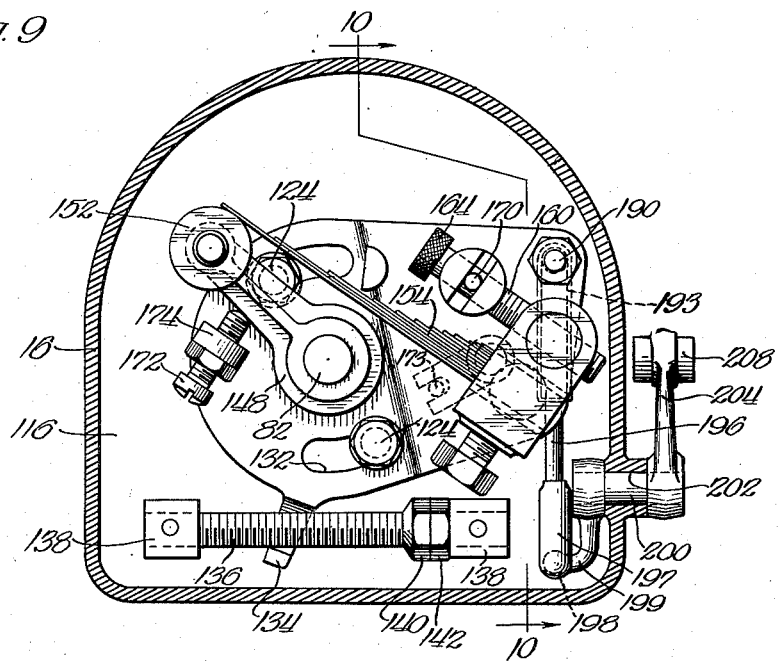
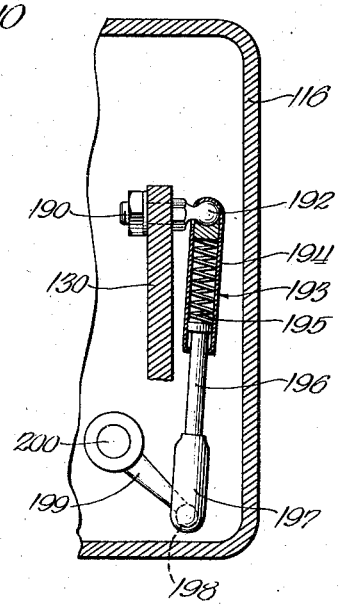
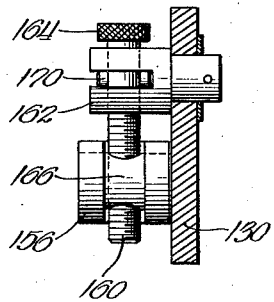
Inventor:
Addison C. Hoof
By Harry H. Hitzeman
Atty.

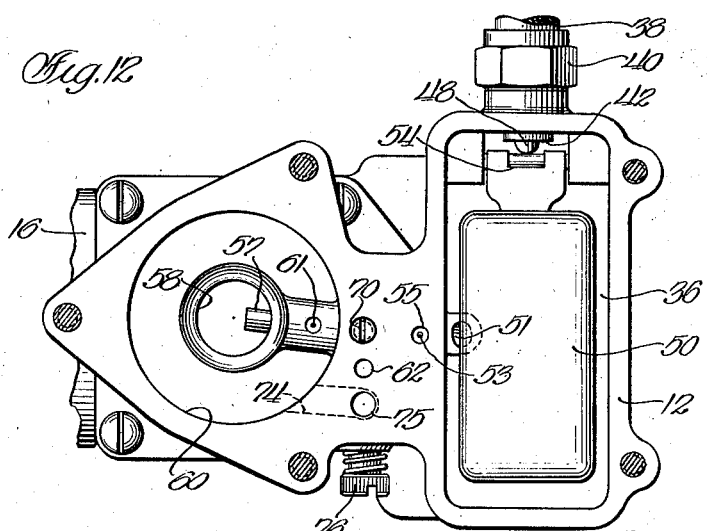
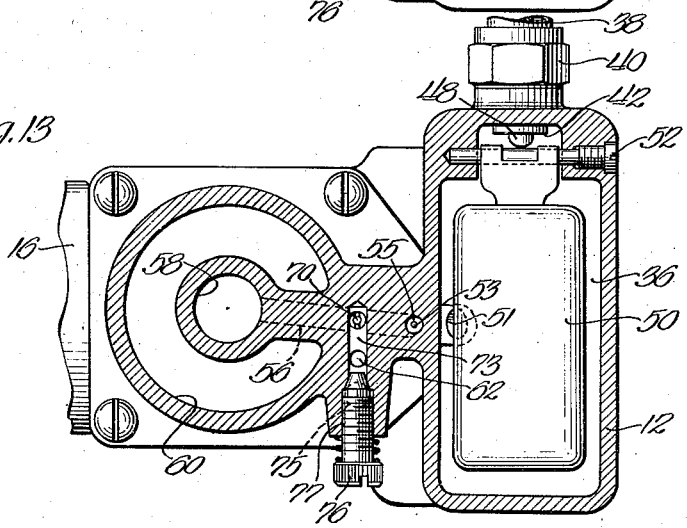
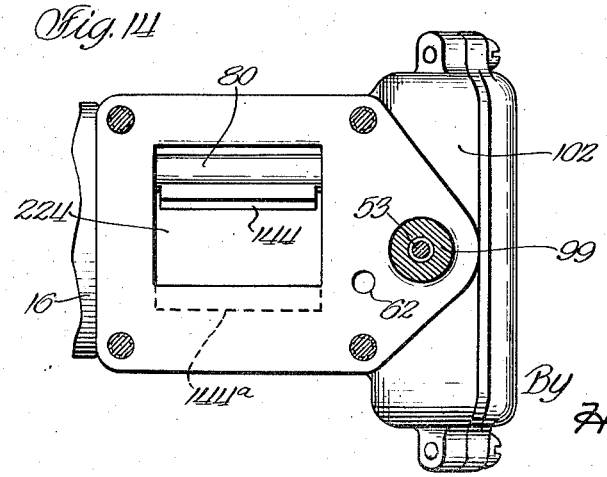

Dec. 28, 1937.   A. C. HOOF   2,103,368
FUEL CONTROL MECHANISM
Filed Sept. 6, 1935   8 Sheets-Sheet 8

Inventor:
Addison C. Hoof
By Harry H. Hitzeman
Atty.

Patented Dec. 28, 1937

2,103,368

UNITED STATES PATENT OFFICE 2,103,368

FUEL CONTROL MECHANISM

Addison C. Hoof, Hinsdale, Ill.

Application September 6, 1935, Serial No. 39,375

18 Claims. (Cl. 261—51)

My invention relates to fuel control means for automotive vehicles and similar devices.

My invention relates more particularly to a fuel mixture control means for automotive devices capable of controlling the amount of liquid fuel which is combined with air or gas to create a combustible gas to such an extent that the highest efficiency will be obtained from the motor by the use of this mixture, and the mixture will be so controlled that the same will be properly proportioned for any desired speed or load of the motor.

The prior art will show devices which have been conceived for governing the speed of a vehicle or automotive engines as required by the users. However, it has been found that more exacting requirements are needed in connection with later developments in automotive engineering.

It is not enough that a governor or control means provide definite speed control and full power capacity. It has been found necessary to efficiently regulate the carburetion, or rather the mixture of the air and liquid fuel which goes to the motor. Consequently, it is necessary to devise something which will act as a carburetor for providing a fuel mixture and will also act as a governor for controlling the amount of liquid fuel and air admitted for different speeds and for different loads.

My invention contemplates the provision of a combined carburetor and governor capable of performing the functions hereinbefore mentioned.

A further object of the invention is to provide improved means of the type described capable of automatic operation to control the quantity and the quality of the fuel mixture flowing to the motor at any and all speeds and under any and all load conditions of the motor.

Another object of my invention is to provide means of this type capable of functioning automatically to control the quantity and the quality of the fuel mixture at any desired rate of speed of the motor.

A further object of my invention is to provide means of this type capable of combining a governor action and a manual throttle action to automatically control the fuel consumption of the engine.

A further object of my invention is to provide a liquid fuel valve capable of being controlled either by a manual throttle means or a governor valve means, yet capable of being jointly controlled by the same, according to the speed and load of the engine.

A further object of the invention is to provide a device of the character described that is comparatively simple in construction and capable of long and continuous operation without having any of its parts become broken or out or order.

Other objects and advantages will be more apparent from the following description wherein reference is had to the accompanying eight sheets of drawings upon which one form of my invention has been illustrated.

In the drawings Fig. 1 is a side elevational view of my improved fuel control means, shown mounted on the intake manifold of an automotive engine.

Fig. 2 is a vertical sectional view through the fuel control means conduit, taken generally on the plane of Fig. 1.

Fig. 2a is an enlarged fragmentary view of the needle valve and passageway in a changed position.

Fig. 4 is a vertical sectional view, taken generally on the lines 4—4 of Fig. 2.

Fig. 5 is a fragmentary vertical sectional view, taken generally on the lines 5—5 of Fig. 2.

Fig. 6 is a plan section through the idling feed opening and is taken generally on the line 6—6 of Fig. 2.

Fig. 9 is a similar view showing the governor parts in a changed position with the governor valve in a normal minimum open position.

Fig. 10 is a vertical sectional view of a fragment of the governor mechanism, taken generally on the line 10—10 of Fig. 9.

Fig. 11 is a fragmentary sectional view of a portion of the governor mechanism and is taken generally on the line 11—11 of Fig. 8.

Fig. 12 is a plan view of the carburetor housing with the choke housing removed and is taken generally on the line 12—12 of Fig. 2.

Fig. 13 is a similar plan sectional view of the carburetor body, taken generally on line 13—13 of Fig. 2.

Fig. 14 is a plan view of the economizer body showing the governor valve in position.

Figure 1:
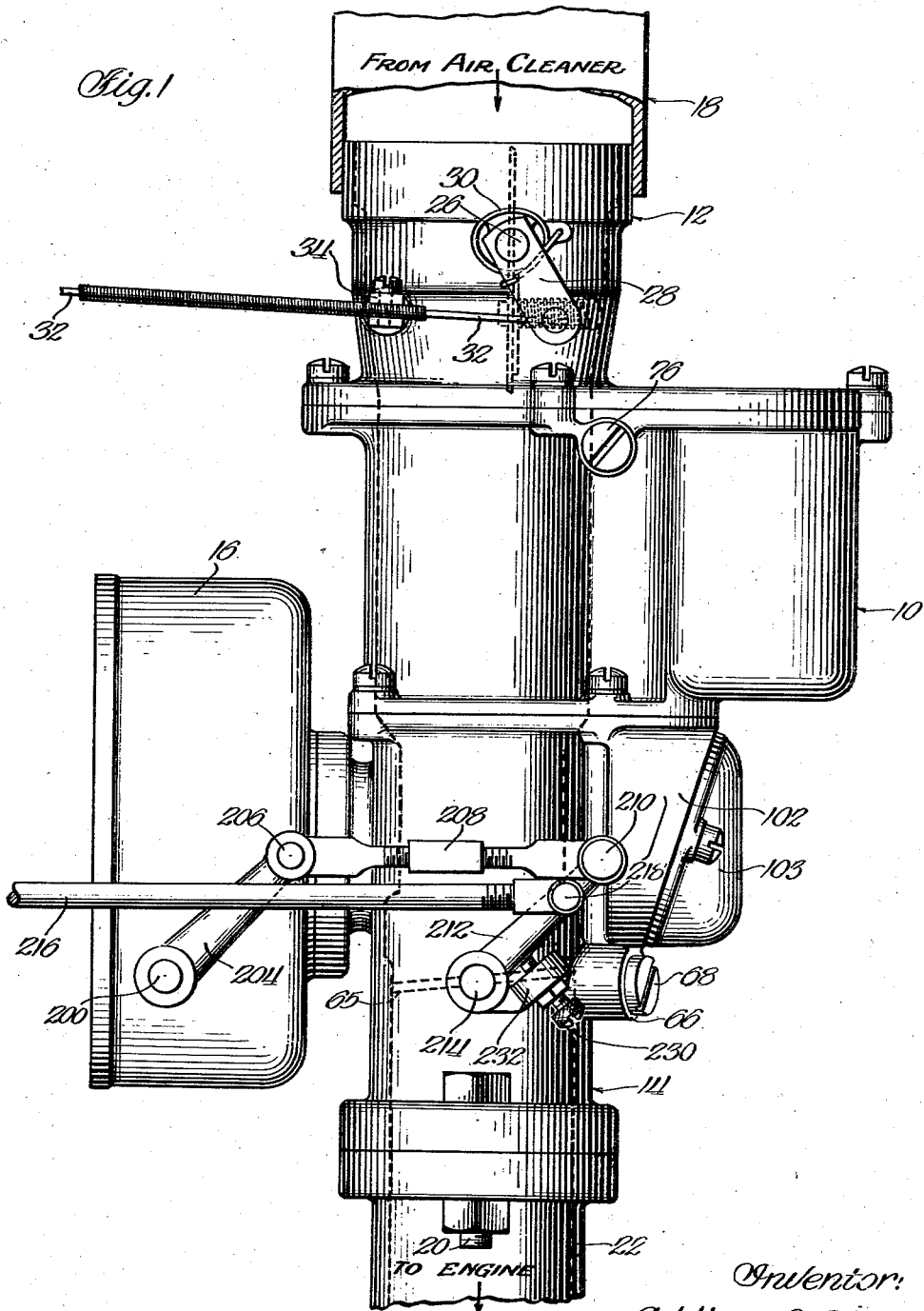

My improved fuel control means may be constructed generally with a carburetor body 10, a choke housing 12, positioned thereabove, an economizer housing 14, positioned therebelow, and a governor member 16, secured to the side of the economizer housing 14. The upper end of choke housing 12 may be connected to a suitable air cleaner 18 or other source of air for mixing in the carburetor. The lower end of economizer housing 14 may be formed with a suitable flange through which bolt members 20 may extend to secure the same to a similar flange on the intake manifold 22 of an internal combustion engine.

A suitable choke member 24 may be mounted in the upper end of choke housing 12 upon a horizontal shaft 26 which extends through the walls of the housing and has an arm 28 connected thereto. A grasshopper spring 30 may be connected between the housing 12 and the arm 28 to normally hold the choke open. A wire 32 may extend from the end of arm 28 and pass through a suitable guide 34 on the side of housing 12 to the instrument panel of an automobile or to any other desirable location, so that the same can be manually operated.

The carburetor body 10 may be formed with a float chamber or gasoline reservoir 36. The liquid fuel inlet thereto is provided through a conduit 38 from a suitable fuel reservoir. The conduit 38 may connect with a suitable coupling 40 having a reduced portion 42 adapted to be screw-threadedly mounted in a suitable opening 44 adjacent the top of the reservoir. The coupling 40 has a passageway 46 therein within which a check valve 48 is adapted to be mounted. The valve 48 is capable of moving forward to close off the supply of liquid fuel under the action of a float member 50 adapted to rise in the reservoir 36 as the same is filled with liquid fuel. The float member 50 is pivotally mounted upon a shaft 52 and carries an upwardly extending arm 54 capable of actuating the valve 48 to move the same to a closed position. The fuel reservoir 36 is further provided with a vertical wall portion 36a for the purpose of limiting the downward movement of the float 50.

A passageway 51 may extend downwardly from the lower portion of reservoir 36 to a vertical passageway 52 within which a needle valve 53 is mounted for reciprocal movement. The passageway 52 is formed with a reduced portion 54 that communicates with a vertical bore 55. An angular cross-bore 56 intersects the bore 55 adjacent its lower end.

A fuel nozzle 57 is adapted to be positioned in the forward end of bore 56 adjacent the center of a Venturi opening 58 formed integral with the carburetor body 10. The opening 58 may be at the forward end of a tubular member 59 which is vertically disposed axially of the passageway 60 of the carburetor body and extends downwardly to the lower end thereof. A small vertical bore 61 extends between the bore 56 and the upper side of the carburetor body 10 and may be used under certain conditions.

With the construction thus far described, it will be apparent that liquid fuel may flow through passageways 51, 54, 55 and upwardly through nozzle 57 into the Venturi opening 58 and be drawn downwardly into the intake manifold of the engine and be thoroughly mixed with the air coming from the air cleaner or other source.

Means for providing an idling speed feed are provided and may generally comprise a passageway 62 extending downwardly through the carburetor body 10 and economizer body 12 to a pair of horizontal ports 63 formed through the wall of economizer housing 12. These ports are adapted to enter the conduit 64 adjacent the butterfly or throttle valve 65. The economizer body 12 is formed with a boss 66 provided with an opening 67 so that the horizontal ports 63 may be drilled through the opening 67. After the same has been accomplished, the opening 67 is closed by a cap member 68.

Figure 3:
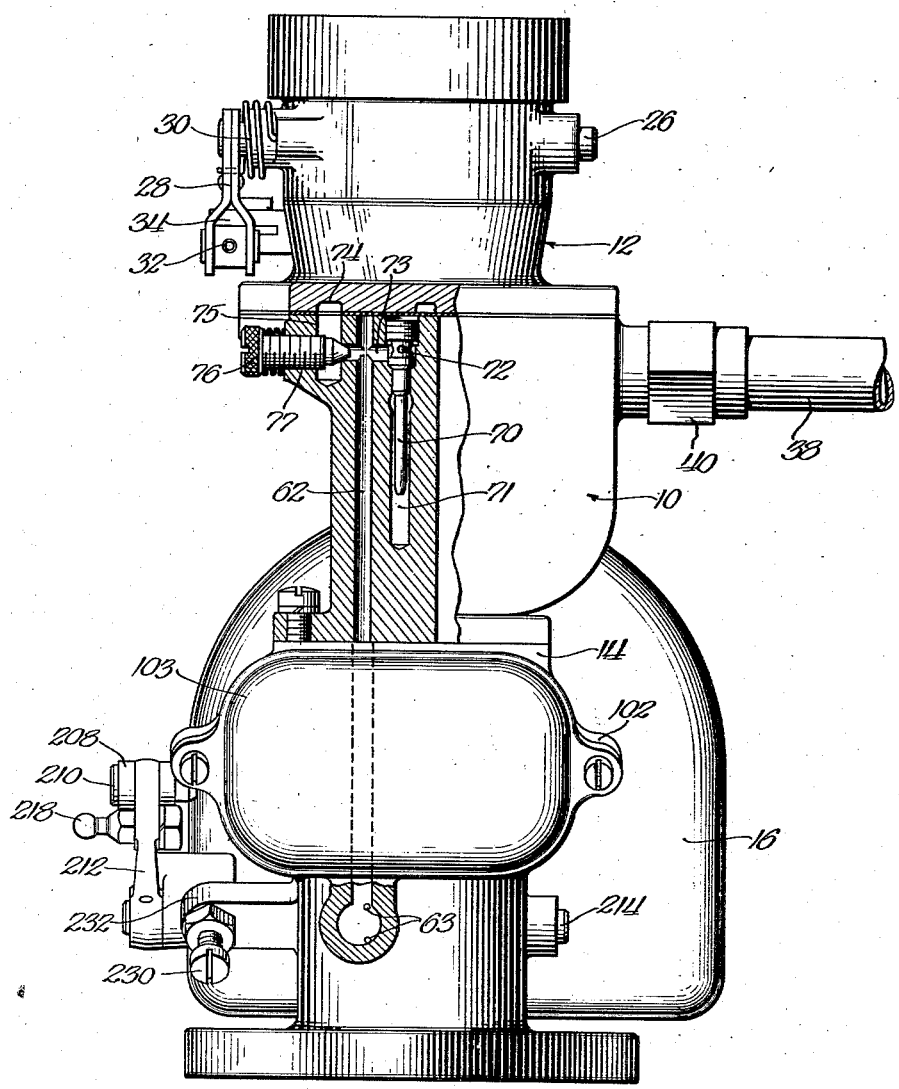
Fig. 3 is a side elevational view generally similar to Fig. 1, with portions broken into section to show the idling feed construction.

In order to regulate the supply of liquid fuel directed to the idling jets 63, I provide an idler metering orifice assembly 70 adapted to be screw-threadedly mounted in a vertical bore 71 in the carburetor body 10 which communicates with the bore 56. Liquid fuel is adapted to be drawn upwardly from the bottom to the interior of the idling metering device 70 and be expelled through the ports 72 into a crossbore 73 (see Fig. 3) which communicates with the vertical passageway 62 extending downwardly to the ports 63. For the purpose of securing a supply of air to force the fluid downwardly, I provide a passageway 74 formed in the lower side of the cover of the idler housing 12 which communicates with the interior of the housing and also with a short vertical bore 75 that communicates with the crossbore 73. An air metering valve 76 is adapted to be screw-threadedly mounted in a suitable opening 77 in the side of carburetor body 10 to regulate the amount of air permitted to enter vertical bore 62, thus regulating the amount of fuel mixture which is drawn into the passageway and downwardly to the idling jets 63.

Means are provided for regulating the position of needle valve 53 in the passageway 54. This means may generally include a governor valve shaft 80 and an economizer shaft 82. These shafts are adapted to be horizontally mounted in the economizer housing 14 upon opposite sides of the passageway 64 and may carry at their outer ends eccentrics 83 and 84. Each of the eccentrics 83 and 84 are formed with a flanged track 85 and adapted to support a fuel valve lever 86. The fuel valve lever is provided with a medial socket 87 adapted to carry a roller member 88. The roller member 88 has a screw-threaded opening 90 therethrough within which the lower screw-threaded end 91 of the needle valve 53 is adapted to be mounted. The needle valve is provided with a kerfed head 92 so that the needle valve can be vertically adjusted in the roller member 88. A set screw 91a is adapted to lock the needle valve in a desired adjusted position. A pair of compression springs 94 are adapted to normally hold the extended ends 95 and 96 of lever 86 in the tracks 85 in the cams 83 and 84.

The needle valve 53 may extend upwardly from its mounting previously described through a packing gland 97 positioned in a suitable opening 98 in an extension 99 of the carburetor body 10. The packing is adapted to be held in position by a suitable follower nut 100.

The cam and lever housing 102 formed in the side of the economizer casting is provided with a cover plate 103 securely fastened thereto by suitable screw members 104 so that the cams and associated parts can be securely enclosed.

Figure 7:
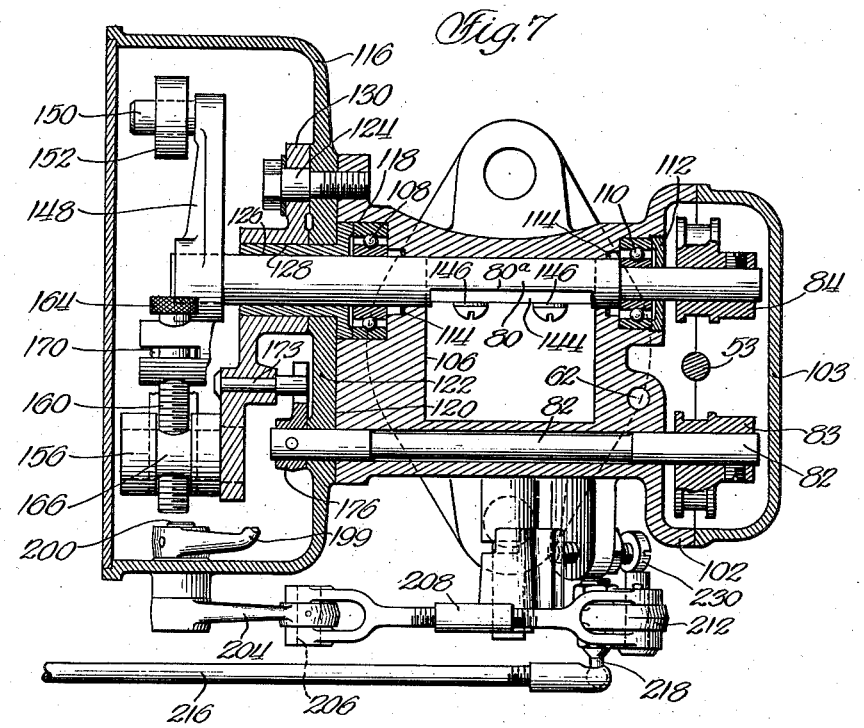
Fig. 7 is a plan sectional view through the governor mechanism and associated parts and is taken generally on the line 7—7 of Fig. 2.

The governor mechanism associated with shaft 80 will now be described. In Fig. 7, I have shown the governor shaft 80 carrying the eccentric 84 extending through the carburetor housing and adjacent a side wall of the square portion 106. The shaft is suitably mounted in ball bearing members 108 and 110 adjacent its two ends. The ball bearing member 110 is secured in a suitable socket by a plate member 112 which screw-threadedly engages in said socket. A sealing washer 114 is provided adjacent each ball bearing member to prevent the suction of air from either the governor casing 116 or the economizer housing 102. The ball bearing member 108 is mounted in a suitable socket 118 adjacent a flattened wall 120 of the carburetor body to which a similar flattened wall 122 of the governor housing is adapted to be secured by suitable bolt members 124.

Figure 8:
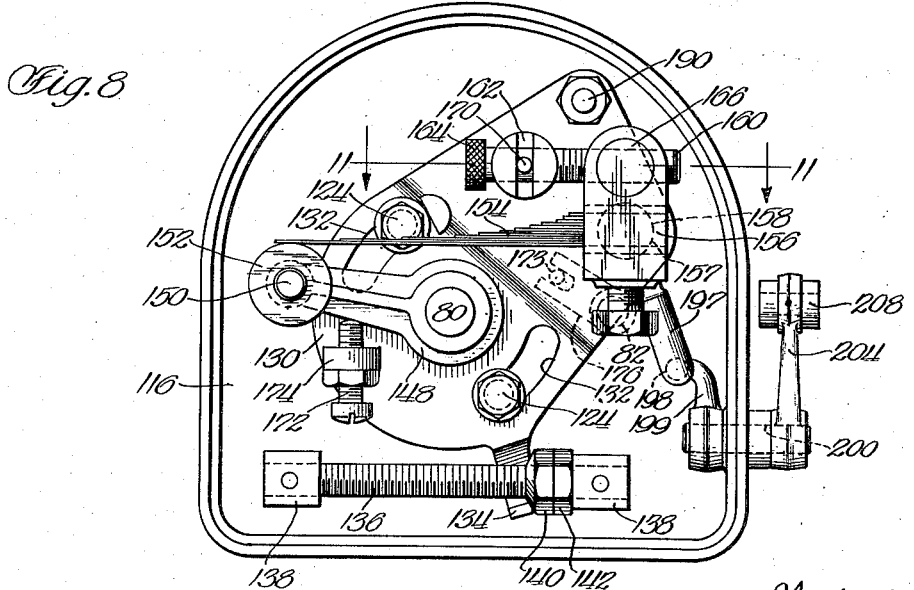
Fig. 8 is an elevational view of the governor mechanism shown with the cover removed from the housing and the governor valve in a normal maximum open position.

The ball bearing member 108 is held in its socket by a suitable bushing member 126 which extends through an opening 128 in the backing plate 130 of the governor assembly. The governor backing plate 130 as shown on the drawings is provided with a pair of elongated slots 132 through which the bolt members 124 are adapted to pass. The backing plate is movable, as will be later explained, and to limit its rotary movement carries an arm 134 which extends downwardly and around a governor plate screw 136 rigidly supported upon the back wall 116 of the governor on a pair of screw support members 138. Adjusting means to limit the open movement of the governor valve assembly are provided and comprise the movable nut member 140 and the lock nut 142 shown in the drawings (Fig. 8) in the extreme open position.

The governor mechanism which I provide may be of the general type shown and described in my patent, Number 1,999,758, issued April 30, 1935, and will therefore be only briefly described in this application. The governor shaft 80 is provided with a flattened portion 80a upon which a valve plate 144 is secured by suitable screw members 146. The shaft 80 may extend through the backing plate 130 and have an arm 148 secured thereto. The arm 148 may have a pin 150 in the end thereof upon which a roller member 152 is mounted. The roller 152 is adapted to engage the end of a multiple leaf spring 154 that has its one end fastened in a clamp or support member 156. The support member 156 has a stud portion 157 extending into a suitable opening 158 in the plate 130 within which the same is rotatably mounted. The support 156 may be adjusted by means of a screw member 160 that is pivotally mounted in a stud 162 journalled in the plate 130. The screw member may be formed with a knurled head portion 164 and extend through a screw-threaded pin 166 carried by the support member 156. A pin 170 extending through the screw member 160 and positioned in a slot in the stud 162 permits rotation of the screw member without lateral movement, thereby effecting a limited adjusting movement to the spring support 156. A stop member 172 may be mounted in a boss 174 on the face of plate 130 to limit the opened position of valve 144 by limiting the rotative movement of shaft 80.

The backing plate 130 carries a pin member 173 adapted to ride in the open bifurcated end of a cam shaft lever 176 that is pinned to the end of economizer shaft 82.

Means for moving the entire governor assembly in accordance with the movement of a manual throttle valve control is provided and comprises a bolt member 190 secured to the upper end of plate 130. The bolt member 190 carries at its lower end (see Fig. 10) a ball head 192 secured in the forward end of a governor plate link assembly 193. This assembly may include a housing 194, a compression spring 195 and a rod member 196 suitably connected at its forward end 197 to a ball head 198 on the end of a lever 199. The lever 199 is secured to a pin 200 which extends through a suitable bearing 202 in the side of the governor housing and is pinned to a similar lever 204. The lever 204 is pivotally connected by a pin 206 to an adjustable link 208 that extends forward to, and is pivotally connected at 210 to a link 212 that is keyed to the butterfly valve shaft 214. A throttle rod 216 is pivotally connected at 218 to the lever 212. The usual butterfly or throttle valve 65 is mounted upon the shaft 214 and positioned in the portion 222 of the passageway through the mechanism.

Referring specifically to Fig. 5, I have shown a portion 144a of the wall of passageway 224 formed with a flat portion and an arcuately shaped or curved portion terminating at a point adjacent the upper end of the governor valve. This construction may be similar to that shown and described in my copending application for patent on Improvement in governors bearing Serial No. 726,670.

Means for adjusting the idling position of the butterfly valve 65 are provided and may comprise the screw member 230 mounted for adjustment in a boss 232 formed on the exterior wall of the housing 14.

Figure 15:
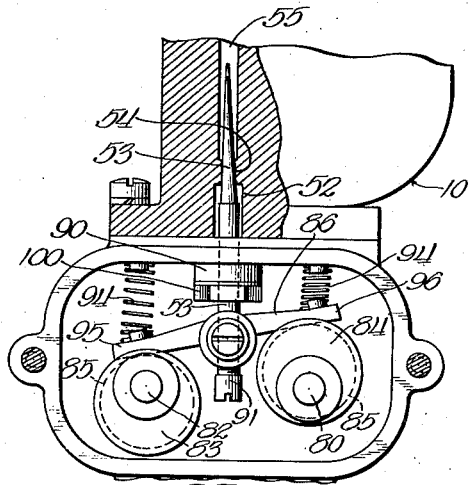
Fig. 15 is a diagrammatic view of the fuel economizer, cams and valve levers shown in the position when the throttle is wide open and the governor is functioning.

The operation of my improved fuel control means will now be described. Assume that the device is mounted between an air inlet from an air cleaner or other source of air and the intake manifold of an internal combustion engine. Assume further that the throttle valve 65 is in closed position and the governor valve 144 is in open position as shown in Figs. 2, 5 and 14. In this position the automotive engine is capable of receiving sufficient fuel to run at an idling speed through the idler feed orifices 63, which, as previously explained, are connected to a source of air and liquid fuel. As the internal combustion engine is accelerated by manually operating the throttle valve 65 by means of throttle rod 216 and the speed of the engine increases, suction in the passageway past governor valve 144 will have a tendency to draw the same to a closed position. As previously mentioned, the purpose of the fuel control means is to control the amount of liquid fuel which is combined with air or gas to create a combustible gas of the highest efficiency proportioned to the speed desired and the load on the engine. Accordingly, if there is a load upon the engine and the throttle valve is opened wide by manual operation, the governor valve will, due to the suction created by the reciprocation of the pistons, be rotated into the path of the inflowing air and tend to decrease the size of the passageway to the engine at the portion 224 in the passageway. At the same time shaft 80 of the governor mechanism will be rotated in a counterclockwise manner and assume the position shown in Fig. 15, carrying the needle valve 53 upwardly in the passageway 54 to reduce the amount of liquid fuel being fed into the Venturi opening 58 through the nozzle 57. As a result, the amount of liquid fuel being fed to the racing engine will be notably decreased.

Figure 17:
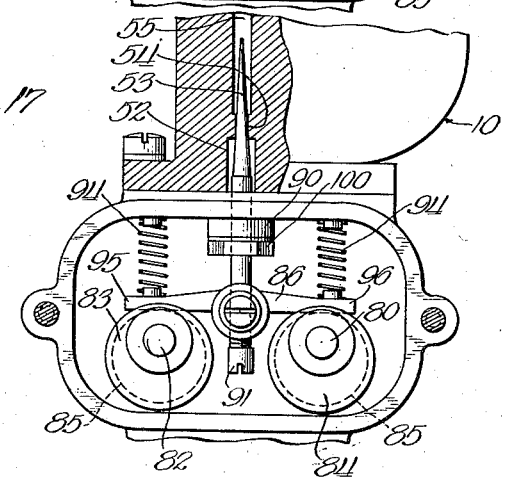
Fig. 17 is a similar view of the same parts in a further changed position shown when the throttle valve and the governor valve are both wide open to allow a maximum flow of fuel to the internal combustion engine.

Assume that the operator of the vehicle or stationary engine upon which the device is located desires a higher speed and a greater load. Movement of the throttle rod 216 to open the butterfly valve will cause through the linkage 208, 204, 199 and 196 a movement of the governor plate assembly in a counterclockwise direction, thus rotating shaft 80 in a counterclockwise direction, and the position of eccentrics 83 and 84 will be that shown in Fig. 17 with the needle valve opened to its fullest extent. At this speed of the engine, if the load decreases, the governor valve, 144 under the action of the velocity previously explained, overcoming the balance of the valve by exceeding the set speed, will move in a clockwise direction and move needle valve 53 to the position shown in Fig. 15 or to this approximate position, depending upon the load and speed required for the governed position.

Figure 16:
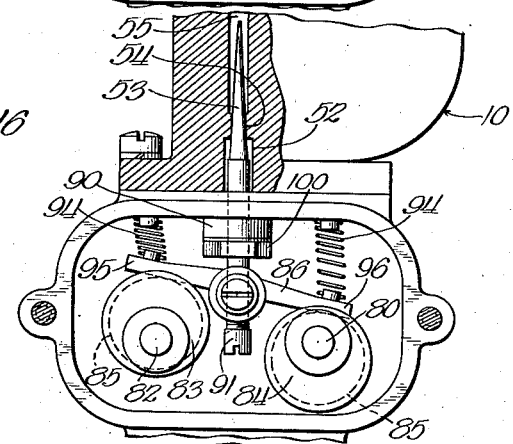
Fig. 16 is a similar diagrammatic view of the same parts shown when the throttle is closed and the governor valve is open.

The position of needle valve 53 shown in Fig. 16 of the drawings is obtained when the throttle valve is approximately closed and the governor valve is open and not yet functioning as a governor because of the position of the throttle valve. As the throttle valve is opened by manual operation, cam 83 moves counterclockwise, opening valve 53 and cam 84 by counterclockwise movement will permit a needle valve adjustment to the correct position for the load and speed desired.

As the throttle is advanced to an assumed speed of forty miles per hour, cam 83 moves to partially open the valve to allow fuel to flow through orifice 57. The engine is accelerated to the amount of metered fuel and the position of the cam 84 permits a wide open position of the governor valve permitting more fuel than the throttle position requires, which if it were not for the governor valve would allow a greater speed than the accelerator throttle opening allows. This is true because the governor valve also acts upon the needle valve to open or close the same. However, the balance of the governor valve will soon be overcome by an increasing speed beyond the set speed of the throttle valve of forty miles per hour, causing the governor valve to close, which in turn, through cam 84, lever 86 and needle valve closes the fuel passage and reduces the speed to the correct speed of 40 miles per hour. This is assuming that the engine on which the governor is installed is traveling along a road in high gear on a level plane. Assuming now that the vehicle is approaching a grade, due to the fact that fuel has been closed to the engine under the control and influence of the governor valve as well as the throttle with the proper mixture for the set speed at which the grade is encountered, the vehicle's speed is retarded and automatically the governor valve opens to permit more fuel and air in proper proportion to the extent of the grade encountered. The adjustment is made by nut 140 and 142, it will be seen that if the adjustment is made for a forty miles per hour speed, the same result will be obtained as in a manual manipulation of the throttle to a definite speed. It will therefore be seen, that fuel, exactly metered to a fine degree according to the load and speed at which the device is set is fed to the engine.

Under all speeds and load conditions, an automatic adjustment of the fuel control means is provided by the operation of the throttle control rod, which meters the fuel and proportions the total volume of air required for the load and speed desired.

It is believed to be clear from the foregoing description that due to the governor control means, the automatic positioning of the needle valve 53 thereby and the cooperation between the governor valve and the butterfly valve to control the position of the needle valve 53 that a highly efficient fuel control mechanism has been provided.

In the construction shown, I have combined the functions of a speed control governor with the further control of the fuel mixture quantity and quality by means of the fuel valve lever and associated mechanism which gives the cooperation obtained between the automatically controlled valve 144 and the manually controlled throttle valve for opening or closing the passageway to the intake manifold.

It will further be apparent that with the construction shown a fuel mixture control mechanism has been provided which automatically operates to provide the proper quality and quantity of fuel mixture, regardless of the density of the air. Thus, the control means is capable of use upon airplane motors and other motors for use in rarefied air or dense air as well as for use upon motors that utilize air at sea level.

This is due to the fact that a balanced valve is employed in the fuel control means which controls the compression ratio uniformly under variations in atmospheric conditions.

While I have illustrated and described one specific embodiment of my invention, it will be apparent to those skilled in the art that modifications and changes may be made in the exact details shown, and I do not wish to limit myself in any particular. Rather, what I desire to secure and protect by Letters Patent of the United States is:

1. Downdraft fuel control means of the class described adapted to be inserted in the inlet conduit of an internal combustion engine, comprising a carburetor body having a conduit therethrough, a governor housing secured thereto, a butterfly valve in said conduit, a governor valve, a liquid fuel supply, a liquid fuel nozzle in said conduit above both of said valves, a fuel valve, an air supply, a manual control for said butterfly valve, an automatic control for said governor valve and means interconnecting said butterfly valve, governor valve and liquid fuel valve for controlling the quality and quantity of fuel mixture flowing to said engine.

2. Downdraft fuel control means of the class described adapted to be inserted in the inlet conduit of an internal combustion engine, comprising a carburetor body having a conduit therethrough, a governor housing secured thereto, a butterfly valve in said conduit, a governor valve in said conduit, a liquid fuel supply, a liquid fuel nozzle in said conduit above both of said valves, a fuel valve, an air supply, a manual control for said butterfly valve, an automatic control for said governor valve and means interconnecting said butterfly valve, governor valve and liquid fuel nozzle for controlling the quality and quantity of fuel mixture flowing to said engine, said fuel valve being a needle valve capable of movement manually or by action of said governor valve.

3. Downdraft fuel control means of the class described adapted to be inserted in the inlet conduit of an internal combustion engine, comprising a carburetor body having a conduit therethrough, a governor housing secured thereto, a butterfly valve in said conduit, a governor valve in said conduit, a liquid fuel supply, a liquid fuel nozzle above both of said valves, a fuel valve, an air supply, a manual control for said butterfly valve, an automatic control for said governor valve adapted to regulate the position of the same according to the load and desired speed of said engine, and means interconnecting said butterfly valve, governor valve and liquid fuel valve for controlling the quality and quantity of fuel mixture flowing to said engine.

4. Downdraft fuel control means of the class described adapted to be inserted in the inlet conduit of an internal combustion engine, comprising a carburetor body having a conduit therethrough, a governor housing secured thereto, a butterfly valve in said conduit, a governor valve in said conduit, a liquid fuel supply, a liquid fuel nozzle above both of said valves, a fuel valve associated therewith, an air supply, a manual control for said butterfly valve, an automatic control for said governor valve, manual means for adjusting the same and means interconnecting said butterfly valve, governor valve and liquid fuel valve for controlling the quality and quantity of fuel mixture flowing to said engine.

5. Fuel mixture control means comprising a passageway adapted to supply a mixture to an internal combustion engine including an unbalanced valve member located in said passageway, a curved wall portion adjacent said unbalanced valve, a manually controlled valve in said passageway, a liquid fuel control means including a fuel nozzle mounted above both of said valves and means interconnecting said unbalanced valve, said liquid control means and said manually operated valve whereby the quantity and quality of fuel mixture flowing to said engine is controlled.

6. Fuel mixture control means comprising a passageway adapted to supply a mixture to an internal combustion engine including an unbalanced valve member located in said passageway, a curved wall portion adjacent said unbalanced valve, a liquid fuel control means including a needle valve mounted above both of said first mentioned valves, a manually controlled valve in said passageway and means interconnecting said unbalanced valve, said needle valve and said manually operated valve whereby the quantity and quality of fuel mixture flowing to said engine is controlled.

7. Fuel mixture control means comprising a passageway adapted to supply a mixture to an internal combustion engine, an unbalanced valve member located in said passageway, means for automatically controlling the position of said valve, a curved wall portion adjacent said unbalanced valve, a liquid fuel supply and an air supply connected to said passageway, a manually operable valve in said passageway, a liquid fuel valve mounted above both of said first mentioned valves, and means interconnecting said unbalanced valve, said manually operated valve and said liquid fuel valve for controlling the quality and quantity of fuel mixture flowing to said engine in conjunction with said automatic means.

8. Fuel mixture control means comprising a passageway adapted to supply a mixture to an internal combustion engine, a liquid fuel supply and an air supply connected to said passageway, a liquid fuel valve, an unbalanced valve member located in said passageway, a curved wall portion in said passageway opposite said unbalanced valve, a manually operable valve in said passageway and interconnected means between said liquid fuel valve, said unbalanced valve and said manually operable valve for controlling the quantity and quality of the flow of fuel mixture to said engine, said means including a rocking lever and cam members for moving the same and spring means for resisting said movements.

9. Fuel mixture control means comprising a passageway adapted to supply a mixture to an internal combustion engine, a liquid fuel supply and an air supply connected to said passageway, a liquid fuel valve, an unbalanced valve member located in said passageway, a curved wall portion in said passageway opposite said unbalanced valve, a manually operable valve in said passageway and interconnected means between said liquid fuel valve, said unbalanced valve, and said manually operable valve for controlling the quantity and quality of the flow of fuel mixture to said engine, said means including a pivotally mounted rocking lever and cam members for moving the same and spring means for resisting said movements.

10. A carburetor for an internal combustion engine having a fuel mixture passageway, an unbalanced valve member mounted in said passageway, means for automatically controlling the position of said valve member in proportion to the capacity of said internal combustion engine, a liquid fuel supply and an air supply connected to said passageway, a curved wall portion in said passageway adjacent said unbalanced valve member, a liquid fuel valve, a manually operable butterfly valve and means connected between said unbalanced valve, said liquid fuel valve and said butterfly valve for controlling the quantity and quality of the flow of fuel mixture to said engine, said means including a pair of eccentrics associated with said manually operable valve and said unbalanced valve, and a lever controlled by said eccentrics associated with said liquid fuel valve.

11. A carburetor for an internal combustion engine having a fuel mixture passageway, an unbalanced valve member mounted in said passageway, means for automatically controlling the position of said valve member in proportion to the capacity of said internal combustion engine, a liquid fuel supply and an air supply connected to said passageway, a curved wall portion in said passageway adjacent said unbalanced valve member, a liquid fuel valve, a manually operable butterfly valve and means connected between said unbalanced valve, said liquid fuel valve, and said butterfly valve for controlling the quantity and quality of the flow of fuel mixture to said engine, said means including a pair of eccentrics associated with said manually operable valve and said unbalanced valve, and a pivotally mounted rocking lever controlled by said eccentrics associated with said liquid fuel valve.

12. A carburetor for an internal combustion engine having a fuel mixture passageway, an unbalanced valve member mounted in said passageway, means for automatically controlling the position of said valve member in proportion to the capacity of said internal combustion engine, a liquid fuel supply and an air supply connected to said passageway, a curved wall portion in said passageway adjacent said unbalanced valve member, a liquid fuel valve, a manually operable butterfly valve and means connected between said unbalanced valve, said liquid fuel valve, and said butterfly valve for controlling the quantity and quality of the flow of fuel mixture to said engine, said means including a pair of eccentrics associated with said manually operable valve and said unbalanced valve, and a rocking pivotally mounted lever operated in one direction by said eccentrics associated with said liquid fuel valve and opposed by spring means.

13. Fuel mixture control means comprising a passageway adapted to supply a mixture to an internal combustion engine, a liquid fuel supply and an air supply connected to said passageway, a liquid fuel valve, an unbalanced valve member located in said passageway, automatic governor means for controlling the closing position of said valve, a curved wall portion in said passageway opposite said unbalanced valve, a manually operable valve in said passageway and interconnected means including said automatic governor means between said liquid fuel valve, said unbalanced valve, and said manually operable valve for controlling the quantity and quality of the flow of fuel mixture to said engine, said means including a rocking lever and cam members for moving the same and spring means for resisting said movements.

14. Fuel control means of the class described adapted to be inserted in the intake conduit of an internal combustion engine, comprising a carburetor body having a conduit therethrough, a valve in said conduit adjacent the engine side thereof, a second valve, said second valve having automatic control means associated therewith and movable to a closed position by the suction in said conduit, a liquid fuel supply, a liquid fuel nozzle in said conduit above both of said valves, a fuel valve, an air supply and means connecting all of said valves for automatically controlling the quantity and quality of fuel mixture flowing to said engine.

15. Fuel control means of the class described adapted to be inserted in the intake conduit of an internal combustion engine, comprising a carburetor body having a conduit therethrough, a valve in said conduit adjacent the engine side thereof, a second valve, said second valve having automatic control means associated therewith and movable to a closed position by the suction in said conduit, said control means including a spring member normally holding said valve open, a liquid fuel supply, a liquid fuel nozzle in said conduit above both of said valves, a fuel valve, an air supply and means connecting all of said valves for controlling the quantity and quality of fuel mixture flowing to said engine.

16. Fuel control means of the class described adapted to be inserted in the intake conduit of an internal combustion engine comprising a carburetor body having a conduit therethrough, a liquid fuel nozzle in said conduit, a fuel valve associated therewith, an unbalanced valve member located in said conduit, an automatic control for said valve member adapted to normally hold said valve open against the closing action of suction in said conduit, said control including an adjustable spring member, a carburetor valve located between said unbalanced valve and the manifold of said engine and means connecting said carburetor valve, said unbalanced valve and said fuel valve for automatically controlling the quality and quantity of fuel gas flowing to said engine.

17. Fuel control means of the class described adapted to be inserted in the intake conduit of an internal combustion engine, comprising a carburetor body having a conduit therethrough, a valve in said conduit adjacent the engine side thereof, a second valve, said second valve having automatic control means associated therewith and movable to a closed position by the suction in said conduit, a liquid fuel supply, a liquid fuel nozzle in said conduit above both of said valves, a fuel valve, an air supply and means connecting all of said valves for controlling the quantity and quality of fuel mixture flowing to said engine, said means including a rocking lever connected to said liquid fuel valve and cam members positioned on opposite ends of said lever.

18. Fuel mixture control means comprising a passageway adapted to supply a mixture to an internal combustion engine, an unbalanced valve member located in said passageway, a curved wall portion adjacent said unbalanced valve, a liquid fuel supply and an air supply connected to said passageway, a manually operable valve in said passageway, a liquid fuel valve, a liquid fuel nozzle controlled thereby and mounted in said passageway above both said unbalanced valve and said manually operable valve and means interconnecting said unbalanced valve, said manually operable valve and said liquid fuel valve for controlling the quality and quantity of fuel mixture flowing to said engine.

ADDISON C. HOOF.